United States Patent
Atarashi et al.

(10) Patent No.: US 6,261,691 B1
(45) Date of Patent: Jul. 17, 2001

(54) POWDER COATED WITH MULTILAYER COATING

(75) Inventors: Takafumi Atarashi, Tokyo; Katsuto Nakatsuka, 3-5-1403, Moniwadai 4-chome, Taihaku-ku, Sendai-shi, Miyagi, both of (JP)

(73) Assignees: Nittetsu Mining Co., Ltd., Tokyo; Katsuto Nakatsuka, Miyagi, both of (JP)

( * ) Notice: Subject to any disclaimer, the term of this patent is extended or adjusted under 35 U.S.C. 154(b) by 0 days.

(21) Appl. No.: 09/202,210

(22) PCT Filed: Jun. 6, 1997

(86) PCT No.: PCT/JP97/01940

§ 371 Date: Apr. 14, 1999

§ 102(e) Date: Apr. 14, 1999

(87) PCT Pub. No.: WO97/47416

PCT Pub. Date: Dec. 18, 1997

(30) Foreign Application Priority Data

Jun. 10, 1996 (JP) .................................................. 8-147419

(51) Int. Cl.$^7$ ........................................................ B32B 5/16

(52) U.S. Cl. ................................................................ 428/403
(58) Field of Search ............................................. 428/403

(56) References Cited

U.S. PATENT DOCUMENTS

| | | | |
|---|---|---|---|
| 4,093,777 | * | 6/1978 | Heine et al. .......................... 428/403 |
| 5,401,306 | * | 3/1995 | Schmid et al. ....................... 106/417 |
| 5,643,674 | * | 7/1997 | Bruno et al. .......................... 428/403 |
| 5,650,002 | * | 7/1997 | Bolt ....................................... 106/438 |
| 5,935,638 | * | 8/1999 | Chandra et al. ........................ 427/58 |

* cited by examiner

*Primary Examiner*—H. Thi Le
(74) *Attorney, Agent, or Firm*—Sughrue, Mion, Zinn, Macpeak & Seas, PLLC

(57) ABSTRACT

A powder comprising a base particle which has been colored desirably and vividly and having a high light transmittance in the visible region. The powder is a multilayer-coated powder comprising a base particle having thereon a multilayered film comprising at least one thin layer comprising a metal sulfide, a metal fluoride, a metal carbonate or a metal phosphate. This multilayered film reflects or absorbs the light having a specific wavelength according to the thickness thereof, the sequence of layer superposition, etc.

14 Claims, 1 Drawing Sheet

POWDER COATED WITH MULTILAYER COATING

TECHNICAL FIELD

The present invention relates to a powder whose surface has been-coated with a multilayered film. More particularly, this invention relates to a multilayer-coated powder suitable for use as a spherical spacer for liquid-crystal displays or a spherical lens for optical fibers and in magnetic coloring materials, such as magnetic color toners and magnetic color inks, retroreflective pigments, and cosmetics functioning to reflect ultraviolet and infrared rays.

BACKGROUND ART

A technique is known which comprises coating a powder with another substance to impart a new function thereto in order to use the powder in various applications.

For example, magnetic coloring materials for use in color electrophotography, etc., such as magnetic color toners and magnetic color inks, comprise magnetic particles as a base and coating films having various light reflection-absorption edges. The fine powders for use as spherical spacers for liquid-crystal displays or spherical lenses for optical fibers comprise a base particle comprising a transparent material, e.g., glass beads, and a light-transmitting film covering the surface thereof as a protective film. Some of the powders for use in cosmetics also comprise pigment particles whose surface has been coated with a substance which reflects ultraviolet and infrared rays.

As such a functional powder, the inventors previously proposed a powder comprising a base particle comprising a metal having thereon a metal oxide film having a uniform thickness and containing a metal different from the metal constituting the base particle (see Unexamined Published Japanese Patent Application No. 6-228604). According to this technique, a magnetic material, such as a metal (e.g., iron, cobalt, nickel), an alloy thereof, or iron nitride, is used as a base particle and two or more kinds of metal oxide films having different refractive indexes are formed thereon each in a thickness corresponding to one-fourth the wavelength of an incident light. Due to this constitution, a magnetic powder for magnetic toner is obtained which reflects all of the incident light and has a white color. Further forming a colored layer on the powder gives a magnetic color toner.

The inventors further improved the above powder and proposed a powder comprising a base particle and, formed thereon, not a combination of metal oxide films but plural layers of an oxide film and a metal film alternatively (see Unexamined Published Japanese Patent Application No. 7-90310). According to this technique, a multilayer-coated powder having excellent properties when used as a magnetic color toner or the like is obtained.

In recent years, further improvements in functions and a further reduction in particle size are required in the functional powders described above.

For example, in the field of color electrophotography, it is becoming necessary to obtain images having higher resolution and higher contrast. With this trend, magnetic color toners are required not only to have a reduced particle diameter to heighten resolution but also to be colored more vividly.

With respect to such requirements, a base particle can be colored desirably according to the above-described multilayer-coated powder proposed by the inventors, by superposing either oxide films or a combination of an oxide film and a metal film on the surface of a base particle in such a manner that high-refractive-index films are disposed alternately with low-refractive-index films to thereby cause the coated particles to have an absorption peak at a specific wavelength or to conversely show exceedingly enhanced reflection in a specific wavelength range.

When the above multilayer-coated powder is applied to magnetic coloring material powders of the three primary colors, the cyan (blue) and yellow powders undoubtedly have improved vividness. However, in producing a powder colored in magenta, there have been cases where increasing the number of films especially for the purpose of obtaining a more vivid color results in a narrowed absorption bottom width, so that the resultant color as a whole is bluish. In application to a transparent white powder, it is important to reduce the scattering and reflection on the powder surface to thereby heighten transparency. However, the multilayer-coated powder described above is insufficient in this respect and it has been impossible to sufficiently color a transparent white powder.

These problems are thought to be attributable to the fact that in the above-described multilayer-coated powder proposed by the inventors because the film constitution is limited to a combination of metal oxides or a combination of metal oxides and metals, the range of refractive indexes obtainable in the whole multilayered film is limited and the delicate regulation of refractive index cannot be obtained.

Furthermore, the spherical lenses for use as spherical spacers for liquid-crystal displays, spherical lenses for optical fibers, or the like are required to have a high incident-light transmittance (transparency) on one hand and to have a reduced particle size on the other hand. However, the smaller the particle diameter, the more the reflective scattering is apt to occur on the surface and in the inner parts of the particles. Consequently, reduced particle diameters generally tend to result in reduced transparency.

A technique of heightening the purity of a substance constituting spherical lenses has conventionally been employed so as to obtain transparency. However, since there are differences in refractive index between each lens and substances adjacent thereto, interference occurs at these interfaces due to the differences in refractive index to provide new reflection sources. Thus, merely heightening the purity of the constituent substance brings about a limited improvement in the transparency of the spherical lenses.

For use in cosmetics and the like, powders are required to combine the function of effectively reflecting ultraviolet and infrared rays with the function of transmitting light in the visible region so as to enable the color of the pigment itself serving as a base particle to be observed. However, the conventional powders have been insufficient.

The present invention has been achieved in view of the circumstances described above. An object of the present invention is to provide a powder comprising a base particle which themselves has been colored desirably and having a high light transmittance in the visible region.

DISCLOSURE OF THE INVENTION

The above object is accomplished with the following powders according to the present invention:

(1) A multilayer-coated powder comprising a base particle having thereon a multilayered film comprising at least one thin layer comprising a metal sulfide, a metal fluoride, a metal carbonate or a metal phosphate, wherein the metal in the metal fluoride, metal carbonate or metal phosphate is an alkali metal or an alkaline earth metal, and the multilayered film reflects a specific wavelength;

(2) A multilayer-coated powder comprising a base particle having thereon a multilayered film comprising at least one thin layer comprising a metal sulfide, a metal fluoride, a metal carbonate or a metal phosphate, wherein the metal in the metal fluoride, metal carbonate or metal phosphate is an alkali metal or an alkaline earth metal, and the multilayered film transmits light in the visible region.

Since the substances constituting the multilayered film in the above constitutions differ from each other in refractive index, the multilayered film as a whole can be made to reflect the light having a specific wavelength or completely transmit the light or incident light having a specific wavelength by suitably changing the thickness of the film or the sequence of layer superposition.

Consequently, by applying the above multilayered film to a base particle of any of various kinds, a functional powder is obtained which has the function possessed by the base particle and which has been colored desirably or is transparent.

For example, when a base particle made of a magnetic material is used, a magnetic color toner colored vividly can be obtained. When a base particle made of a glass or transparent resin is used, spherical lenses can be obtained which have high transparency and are suitable for use as spherical spacers for liquid.

The substances usable for constituting the multilayered film in the present invention are metal sulfides, metal fluorides, metal carbonates, and metal phosphates.

Metal sulfides have a refractive index higher than metal oxides. Specifically, the refractive index of cadmium sulfide is 2.6 and that of zinc sulfide is from 2.3 to 2.4.

Metal fluorides have a low refractive index which cannot be obtained with metal oxides. Especially preferred are the fluorides of alkali metals or alkaline earth metals.

Specifically, the refractive index of calcium fluoride is 1.23 to 1.26; that of sodium fluoride is 1.34; that of trisodium aluminum fluoride is 1.35; that of lithium fluoride is 1.37; and that of magnesium fluoride is 1.38.

Metal phosphates or metal carbonates have refractive indexes intermediate between those of the metal sulfides and those of the metal fluorides. Especially preferred are the phosphates or carbonates of alkali metals or alkaline earth metals. Due to the use of these metal phosphates or metal carbonates, the choice of films can be widened and the refractive indexes of the whole multilayered film can be regulated delicately to attain a combination of more various refractive indexes.

Specifically, the refractive index of calcium phosphate is 1.6; that of sodium phosphate is 1.58; that of cerium phosphate is 1.8; and that of lanthanum phosphate is 1.8. The refractive index of calcium carbonate is 1.66; that of magnesium carbonate is 1.6 to 1.7; that of barium carbonate is 1.6; and that of strontium carbonate is from 1.5 to 1.6.

It is possible to add metal chalcogenides other than the above-described metal sulfides, and metal oxides to the film materials. In this case, the metals are not particularly limited, and ones having a desired refractive index can be suitably selected.

Examples of the metal chalcogenides include metal tellurides and metal selenides. The refractive indexes of these chalcogenides are roughly in the range of 2.4 to 3.0, although they vary depending on to the kinds of the metals.

Examples of the metal oxides include those given in Unexamined Published Japanese Patent Applications Nos. 6-22286 and 7-90310, both filed by the present inventors. However, the metal oxides should not be construed as being limited thereto. The refractive indexes of the metal oxides are roughly in the range of 1.8 to 2.6, although they vary depending on the kinds of the metals.

If necessary, films of metals selected, for example, from silver, cobalt, nickel, iron, and alloys thereof may be further added.

By the use of these films, the multilayered film can be regulated so as to have more various refractive indexes.

For forming films comprising the above-described metal sulfides, metal fluorides, metal carbonates, and metal phosphates, the following methods are preferably used, which are advantageous from the standpoints of film evenness and film thickness regulation:

A. Film formation by solid deposition in liquid phase;

B. Film formation in vapor phase (CVD and PVD).

Film formation by these methods can be conducted according to known steps using conditions suitably selected for each step according to the material.

In the case of adding a metal oxide film, it is preferred to use the film-forming method using a metal alkoxide which is described in Unexamined Published Japanese Patent Applications Nos. 6-22286 and 7-90310, both filed by the present inventors.

In the case of adding a metal film, it can be formed by electroless plating or contact electroplating or by sputtering. However, the thickness of a film formed by contact electroplating or sputtering may vary from particle to particle, because there are cases where in the contact electroplating, powder particles not in contact with an electrode are not plated, and in the sputtering, a metal vapor does not evenly collide against the powder particles. Consequently, film formation by electroless plating is preferred.

In the film-forming methods described above, films are designed in the following manner.

Coating films differing in refractive index are alternately formed on each base particle so as to satisfy the following equation (1). Namely, coating films which each is made of a substance having a refractive index n and has a thickness d corresponding to m (integer) times the value which is one-fourth a wavelength of visible light are formed in an appropriate thickness and number. As a result, the light having a specific wavelength $\lambda$ (the light utilizing Fresnel's interference reflection) is reflected or absorbed.

$$nd = m\lambda/4 \qquad (1)$$

By utilizing this principle to conduct a film design, it is possible to form a film which reflects the light having specific wavelengths to develop the color corresponding to the reflected light. Alternatively, a film which transmits incident light throughout its wavelength range and which is hence transparent can be formed.

In actual film formation, the film thickness of each layer is designed while determining the change of optical film thickness, which is the product of the refractive index of the film and the film thickness, as a reflection waveform by means of a spectrophotometer or the like so that the reflection waveform conforms to the waveform of a target color. For example, when a multilayered film is constituted of unit coating films which have reflection waveform peaks located apart from each other in two or more positions throughout the visible region, the multilayered film is a white film which wholly reflects the visible light. When the unit coating films are regulated so that the reflection waveform peaks thereof are in exactly the same position, the multilayered film can be monochromatically colored in, e.g., blue, green, or yellow, without using a dye or pigment.

Furthermore, a transparent film can also be obtained by reducing the reflectance to an exceedingly low level.

On the other hand, the base particle in the present invention can be selected from various materials according to the purposes thereof. That is, a powder coated with the multi-layered film described above is a functional powder which has the function possessed by the base particle and which has been colored desirably or is transparent.

For example, when a magnetic material is used as a base material, a magnetic color toner colored vividly can be obtained. When a base particle made of a glass or transparent resin is used, spherical lenses can be obtained which have high transparency and are suitable for use as spherical spacers for liquid-crystal displays, spherical lenses for optical fibers, etc. Furthermore, when a pigment is used as a base particle, a cosmetic functioning to reflect ultraviolet and infrared rays can be obtained.

MODES FOR CARRYING OUT THE INVENTION

Figure 1:
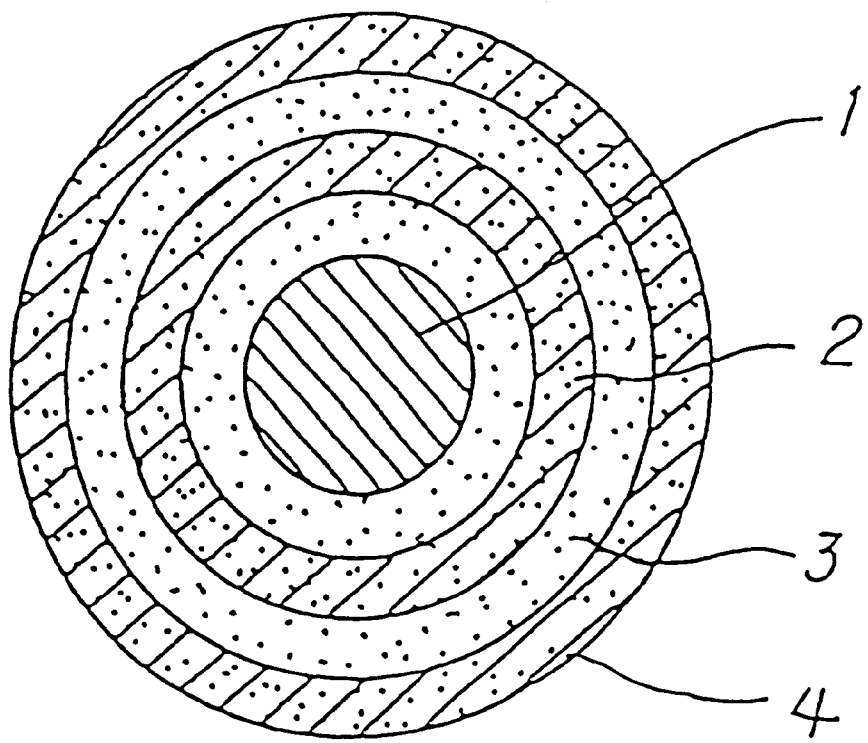
FIG. 1 diagrammatically illustrates, by means of a sectional view, the structure of a particle of a multilayer-coated powder according to the present invention. This particle contains a base particle 1 as a core and is constituted by successively superposing, on the surface of the core, films 2, 3, and 4 each selected from metal sulfides, metal fluorides, metal carbonates, and metal phosphates and regulated so as to have a specific thickness.

The present invention can be understood more clearly by reference to the following Examples. However, the invention should not be construed as being limited by these Examples in any way.

EXAMPLE 1

(transparent powder)

Fifty grams of glass beads (average particle diameter, 33 $\mu$m) were dispersed into an aqueous solution prepared beforehand by dissolving 11.3 g (0.25 mol/l) of calcium chloride in 600 ml of water. A solution prepared beforehand by dissolving 20 g of calcium carbonate in 600 ml of water was gradually added dropwise to the dispersion under stirring over 1 hour.

After the dropping, the solution was allowed to react while maintaining the temperature of the solution at 60° C. After completion of the reaction, the reaction mixture was washed with a sufficient amount of deionized water with decantation, and the solid matter was then separated by filtration. The calcium carbonate-coated powder obtained was dried and heated in a vacuum dryer at 180° C. for 8 hours.

The powder thus obtained had a calcium carbonate film (refractive index, 1.65) formed on the glass beads, and the thickness of the film was 278 nm.

Subsequently, 40 g of the calcium carbonate-coated powder was added to a solution prepared by dissolving 12.8 g of zircon butoxide in 200 ml of isopropanol. A solution prepared by mixing 3.7 g of water with 25 g of propanol was added dropwise over 1 hour to the above solution under stirring while maintaining the solution at 55° C.

After the dropping, the mixture was allowed to react for 7 hours. The resultant reaction mixture was washed with a sufficient amount of propanol with decantation. The solid matter was taken out by filtration and then dried and heated in a vacuum dryer at 180° C. for 8 hours.

Thus, a zirconia-calcium carbonate-coated powder was obtained. The zirconia film (refractive index, 2.10) of this zirconia-calcium carbonate-coated powder had a thickness of 143 nm.

Furthermore, 20 g of the zirconia-calcium carbonate-coated powder was stirred in a rotating fluidized bed in vacuo. Simultaneously with the stirring, a tungsten board disposed in the rotating fluidized bed apparatus and filled with a magnesium fluoride powder was heated. A vapor of magnesium fluoride was thus generated to treat the coated powder for 2 hours to thereby obtain a magnesium fluoride-zirconia-calcium carbonate-coated powder. The magnesium fluoride film (refractive index, 1.38) of this magnesium fluoride-zirconia-calcium carbonate-coated powder had a thickness of 109 nm.

The thus-obtained glass beads coated with the three layers had a considerably reduced reflectance of 0.7% or less in the range of 380 nm to 780 nm. Probably, this is because the glass beads had been reduced in scattering by the formation of the multilayered film.

EXAMPLE 2

(purple magnetic pigment)

First Layer: Silica Film:

Into 500 ml of ethanol was dispersed 50 g of a carbonyl iron powder (average particle diameter, 1.8 $\mu$m) manufactured by BASF. Thereto were added 20 g of silicon ethoxide, 15 g of ammonia water (29%), and 20 g of water. This mixture was allowed to react for 5 hours under stirring. After the reaction, the reaction mixture was diluted and washed with ethanol and filtered. Thereafter, the solid matter was dried in a vacuum dryer at 110° C. for 3 hours. After the drying, the resultant powder was heated with a rotary tubular oven at 650° C. for 30 minutes to obtain silica-coated powder A.

After the heating, 40 g of the silica-coated powder A obtained was redispersed into 400 ml of ethanol. Thereto were added 12 g of silicon ethoxide and 16 g of ammonia water (29%). This mixture was allowed to react for 5 hours, and then dried in vacuo and heated in the same manner as in the first coating. Thus, silica-coated powder B was obtained.

The silica-coated powder B obtained had satisfactory dispersibility and was an independent particle. The silica film (refractive index, 1.51) formed on the surface of the carbonyl iron powder had a thickness of 300 nm.

Second Layer: Zinc Sulfide Film:

To a solution prepared beforehand by dissolving 1.34 g of zinc ethoxide was added 30 g of the silica coated powder B. Hydrogen sulfide gas was fed thereto under stirring at a rate of 3 ml/min to conduct bubbling for 3 hours. The resultant reaction mixture was diluted and washed with a sufficient amount of ethanol, dried in a vacuum dryer for 1 hour, and then heated with a rotary tubular oven at 650° C. for 30 minutes to obtain a zinc sulfide-silica-coated powder.

The zinc sulfide-silica-coated powder obtained had satisfactory dispersibility and was an independent particle. This zinc sulfide-silica-coated powder had a spectral reflection curve having a peak wavelength of 770 nm and had a reflectance at the peak wavelength of 50%. It was vivid yellow. The zinc sulfide film (refractive index, 2.3) of the zinc sulfide-silica-coated powder had a thickness of 12 nm.

Third Layer: Magnesium Fluoride Film:

Twenty grams of the zinc sulfide-silica-coated powder was stirred in a rotating fluidized bed in vacuo. Simultaneously with the stirring, a tungsten board disposed in the rotating fluidized bed apparatus and filled with a magnesium fluoride powder was heated. A vapor of magnesium fluoride was thus generated to treat the coated powder for 2 hours to thereby obtain a magnesium fluoride-zinc sulfide-silica-coated powder.

The magnesium fluoride film (refractive index, 1.38) of the magnesium fluoride-zinc sulfide-silica-coated powder had a thickness of 124 nm.

The carbonyl iron powder obtained through coating with the three layers had an absorption bottom at 525 nm, at which the reflectance was 15%. The difference between this reflectance and a maximum reflectance of 60% (780 nm) was 35%. It was vivid purple.

INDUSTRIAL APPLICABILITY

As described above, since the substances constituting the multilayered film in the present invention differ from each other in refractive index, the multilayered film as a whole can be made to reflect the light having a specific wavelength or completely transmit the light or incident light having specific wavelengths by suitably changing the thickness of the film or the sequence of layer superposition.

Consequently, by applying the above multilayered film to a base particle of any of various kinds, a functional powder is obtained which has the function possessed by the base particle and which has been colored vividly or is transparent.

For example, when a base particle made of a magnetic material is used, a magnetic color toner colored vividly can be obtained. When a base particle made of a glass or transparent resin is used, spherical lenses can be obtained which have high transparency and are suitable for use as spherical spacers for liquid-crystal displays, spherical lenses for optical fibers, etc. Furthermore, when a pigment is used as a base particle, a cosmetic functioning to reflect ultraviolet and infrared rays can be obtained.

What is claimed is:

1. A multilayer-coated powder comprising a base particle having thereon a multilayered film comprising at least one metal sulfide layer and at least one layer selected from the croup consisting of a metal fluoride, a metal carbonate and a metal phosphate, wherein the metal in the metal fluoride, metal carbonate or metal phosphate is an alkali metal or an alkaline earth metal, the multilayered film reflects a specific wavelength, and each layer of the multilayered film has a different refractive index.

2. The multilayer-coated powder according to claim 1, wherein the metal sulfide is selected from the group consisting of zinc sulfide and cadmium sulfide.

3. The multilayer-coated powder according to claim 1, wherein the base particle is spherical.

4. A multilayer-coated powder comprising a base particle having thereon a multilayered film comprising at least one layer comprising a metal sulfide, a metal fluoride, a metal carbonate or a metal phosphate, wherein the metal in the metal fluoride, metal carbonate or metal phosphate is an alkali metal or an alkaline earth metal, the multilayered film transmits light in the visible region, and each layer of the multilayered film has a different refractive index.

5. The multilayer-coated powder according to claim 4, wherein the multilayered film comprises a metal sulfide layer and at least one layer selected from the group consisting of a metal fluoride, a metal carbonate and a metal phosphate, said metal in the metal fluoride, metal carbonate and metal phosphate is an alkali metal or an alkaline earth metal.

6. The multilayer-coated powder according to claim 4, wherein the metal sulfide is selected from the group consisting of zinc sulfide and cadmium sulfide.

7. The multilayer-coated powder according to claim 4, wherein the base particle is spherical.

8. A multilayer-coated powder comprising a base particle having thereon a multilayered film comprising at least one layer comprising a metal sulfide selected from the group consisting of zinc sulfide and cadmium sulfide, a metal fluoride, a metal carbonate or a metal phosphate, wherein the metal in the metal fluoride, metal carbonate or metal phosphate is an alkali metal or an alkaline earth metal, the multilayered film reflects a specific wavelength, and each layer of the multilayered film has a different refractive index.

9. The multilayer-coated powder according to claim 8, wherein the base particle is spherical.

10. A multilayer-coated powder comprising a base particle having thereon a multilayered film comprising at least one metal sulfide layer and at least one layer selected from the group consisting of a metal fluoride, a metal carbonate and a metal phosphate, wherein the metal in the metal fluoride, metal carbonate or metal phosphate is an alkali metal or an alkaline earth metal, the multilayered film transmits light in the visible region, and each layer of the multilayered film has a different refractive index.

11. The multilayer-coated powder according to claim 10, wherein the metal sulfide is selected from the group consisting of zinc sulfide and cadmium sulfide.

12. The multilayer-coated powder according to claim 10, wherein the base particle is spherical.

13. A multilayer-coated powder comprising a base particle having thereon a multilayered film comprising at least one layer comprising a metal sulfide selected from the group consisting of zinc sulfide and cadmium sulfide, a metal fluoride, a metal carbonate or a metal phosphate, wherein the metal in the metal fluoride, metal carbonate or metal phosphate is an alkali metal or an alkaline earth metal, the multilayered film transmits light in the visible region, and each layer of the multilayered film has a different refractive index.

14. The multilayer-coated powder according to claim 13, wherein the base particle is spherical.

* * * * *